United States Patent
Schachtely et al.

(10) Patent No.: US 7,739,216 B2
(45) Date of Patent: Jun. 15, 2010

(54) METHODS AND SYSTEMS FOR MONITORING AND DIAGNOSING MACHINERY BY INCREMENTLY TESTING A RULE

(75) Inventors: Alan Thomas Schachtely, Minden, NV (US); John Wesley Grant, Gardnerville, NV (US); Richard Lewis Gomer, Gardnerville, NV (US); Bradley Ted Kelly, Gardnerville, NV (US); Chad Eric Knodle, Dayton, NV (US); Patrick Louis Pfrehm, Carson City, NV (US); James Joseph Schmid, Kirkland, WA (US)

(73) Assignee: General Electric Company, Schenectady, NY (US)

( * ) Notice: Subject to any disclaimer, the term of this patent is extended or adjusted under 35 U.S.C. 154(b) by 672 days.

(21) Appl. No.: 10/829,585

(22) Filed: Apr. 22, 2004

(65) Prior Publication Data

US 2005/0240545 A1 Oct. 27, 2005

(51) Int. Cl.
*G06N 5/02* (2006.01)
(52) U.S. Cl. .................. 706/47; 340/679; 340/825.36; 700/83; 709/224
(58) Field of Classification Search ............ 700/83; 709/224; 340/825.36, 679; 706/47
See application file for complete search history.

(56) References Cited

U.S. PATENT DOCUMENTS

| 5,311,562 | A | 5/1994 | Palusamy et al. |
| 5,905,989 | A | 5/1999 | Biggs |
| 6,026,348 | A | 2/2000 | Hala |
| 6,092,029 | A | 7/2000 | Bently |
| 6,405,139 | B1 | 6/2002 | Kicinski et al. |
| 6,421,571 | B1 | 7/2002 | Spriggs et al. |
| 6,507,804 | B1 | 1/2003 | Hala et al. |
| 6,542,595 | B1 * | 4/2003 | Hemzal ................. 379/201.03 |
| 6,633,782 | B1 | 10/2003 | Schleiss et al. |
| 6,654,932 | B1 * | 11/2003 | Bahrs et al. ................. 715/507 |
| 6,795,798 | B2 * | 9/2004 | Eryurek et al. .............. 702/188 |
| 6,965,887 | B2 * | 11/2005 | Huelsman et al. ............. 706/47 |
| 2004/0189708 | A1 * | 9/2004 | Larcheveque et al. ....... 345/780 |
| 2004/0243530 | A1 * | 12/2004 | Al-Attar et al. ............... 706/45 |
| 2006/0265689 | A1 * | 11/2006 | Kuznetsov et al. .......... 717/117 |

\* cited by examiner

*Primary Examiner*—Albert DeCady
*Assistant Examiner*—Tejal J Gami
(74) *Attorney, Agent, or Firm*—Armstrong Teasdale LLP

(57) ABSTRACT

A computer-implemented method of managing a machinery monitoring system is provided. The method includes relating an asset output to at least one asset input, generating at least one rule based on the relation, selecting at least one of live asset data, historical asset data, user-supplied asset data, and third party supplied asset data to test the at least one rule, testing the at least one rule incrementally using the selected asset data, and monitoring the output of the at least one rule at each increment.

42 Claims, 9 Drawing Sheets

```
<Root>
    <RuleSetID>GUID</RuleSetID>
    <RuleSetName>Name</RuleSetName>
    <RuleSetDescription>Description Text</RuleSetDescription>
    <RuleSetVersion>X.XX</RuleSetVersion>
    <RuleSetRevision>Free Entry Text</RuleSetRevision>
    <RuleSetState> Development/Deployed <RuleSetState>
    <RuleSetAsset> Asset Type</RuleSetAsset>
    <CustomRuleCount>N</CustomRuleCount>
    <CustomRule0>
        Custom Rule (Defined by Template Importer/Exporter)</CustomRule0>
    <CustomRule1>
        Custom Rule (Defined by Template Importer/Exporter)</CustomRule1>
        ......
    <CustomRuleN>
        Custom Rule (Defined by Template Importer/Exporter)</CustomRuleN>
</Root>
```

FIG. 2

METHODS AND SYSTEMS FOR MONITORING AND DIAGNOSING MACHINERY BY INCREMENTALLY TESTING A RULE

BACKGROUND OF THE INVENTION

This invention relates generally to monitoring systems, and more particularly to methods and systems for monitoring and diagnosing machinery.

At least some known monitoring systems, monitor machine drivers, for example, motors and turbines, or machine driven components, such as, pumps, compressors, and fans. Other known monitoring systems monitor process parameters of a process, for example, piping systems. Such monitoring systems may operate independent of, or may be integrated through, a distributed control system (DCS). The DCS may permit a user to create various combinations of parameters to perform analysis functions. However, within known distributed control systems, such combinations and analysis functions are specific to the DCS platform they are executing on, and as such, are generally not usable to monitor a plurality of machines or on other DCS systems without significant editing of software code.

Currently, software rules used to direct receipt, analysis and output of parameters that are measured for monitoring machinery are custom coded for each system on which they are operating. To operate properly, the rules may need to be set up in a very specific manner. Accordingly, system setup may take an excessive amount of service time to set-up the rules. In addition, optimizing rules to obtain accurate results in diagnosing machine malfunctions may also be time consuming, as no mechanism may exist that enables rules from one system to be copied or moved to another system. For example, a complex set of rules that diagnose a set of malfunctions on a particular machine type may have to be created by hand within on each system in which it is used, which may be a complicated and costly process. In addition, no known methods are available to validate the rules in a testing environment prior to putting the rules into service. Also, the software rules capturing the machine troubleshooting, analysis, and diagnosis knowledge of application engineers in a robust list of instructions may be a marketable intellectual property for the application engineers and for their employer. However, only very basic security features may be incorporated to protect this intellectual property.

BRIEF DESCRIPTION OF THE INVENTION

In one aspect, a computer-implemented method of managing a machinery monitoring system is provided. The method includes relating an asset output to at least one asset input, generating at least one rule based on the relation, selecting at least one of live asset data, historical asset data, user-supplied asset data, and third party supplied asset data to test the at least one rule, testing the at least one rule incrementally using the selected asset data, and monitoring the output of the at least one rule at each increment.

In another aspect, a computer-implemented machinery monitoring system for a plant is provided. The system includes a client system having a user interface, a database for storing Rule Sets, wherein the Rule Sets include at least one rule expressed as a relational expression of a real-time data output relative to a real-time data input, wherein the relational expression is specific to a plant asset, and a processor programmed to control the machinery monitoring system to prompt a user for a security control password, generate a plant asset operational rule from an application expert, test the rule based on at least on of live asset data, historical asset data, user-supplied asset data, and third party supplied data, and display incremental results of the test.

In yet another aspect, a computer program embodied on a computer readable medium for managing a machinery monitoring system is provided. The system includes a server system coupled to a client system and an enterprise database, the client system including a user interface. The program includes a code segment that prompts a user for a security control password and then generates a plant asset operational rule from an application expert, tests the rule based on at least on of live asset data, historical asset data, user-supplied asset data, and third party supplied data, and displays incremental results of the test.

BRIEF DESCRIPTION OF THE DRAWINGS

FIG. 2 is a text listing of an exemplary Rule Set Extended Mark-up Language (XML) file that may be used with the CIMMS shown in FIG. 1;

DETAILED DESCRIPTION OF THE INVENTION

Figure 1:
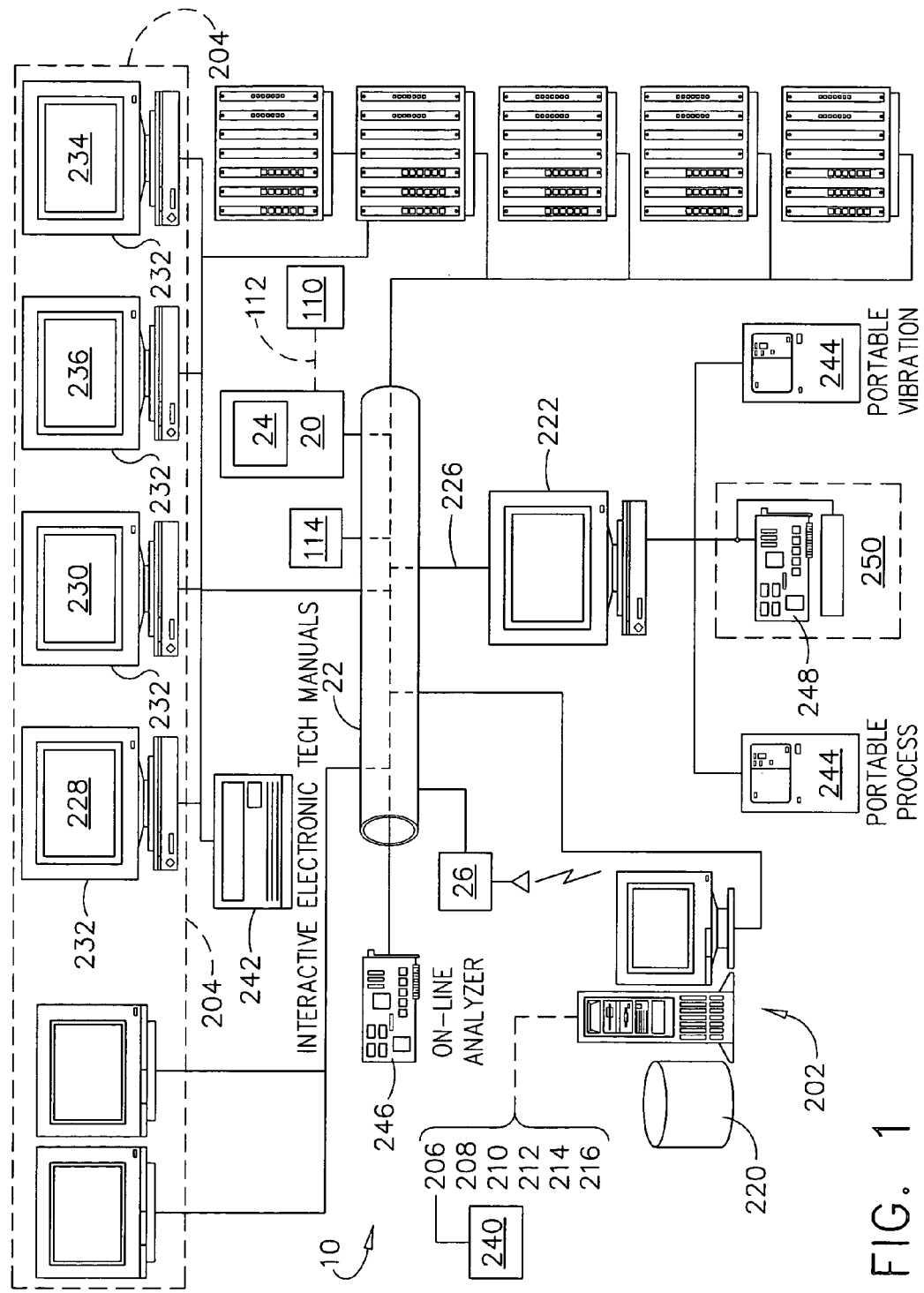
FIG. 1 is a block diagram of an exemplary embodiment of a network architecture of a real-time industrial plant monitoring and control system.

FIG. 1 is a block diagram of an exemplary embodiment of a network architecture 10 of a real-time industrial plant monitoring and control system, such as a distributed control system (DCS) 20. The industrial plant may include a plurality of plant equipment, such as pumps, motors, fans, and process monitoring sensors that are coupled in flow communication through interconnecting piping, and coupled in signal communication with DCS 20 through one or more remote input/output (I/O) modules and interconnecting cabling and/or wireless communication. In the exemplary embodiment, the industrial plant includes DCS 20 including a network backbone 22. Network backbone 22 may be a hardwired data communication path fabricated from twisted pair cable, shielded coaxial cable or fiber optic cable, for example, or may be at least partially wireless. DCS 20 may also include a processor 24 that is communicatively coupled to the plant equipment, located at the industrial plant site or at remote locations, through network backbone 22. It is to be understood that any number of machines may be operatively connected to network backbone 22. A portion of the machines may be hardwired to network backbone 22, and another portion of the machines may be wirelessly coupled to backbone 22 via a base station 26 that is communicatively coupled to DCS 20. Wireless base station 26 may be used to expand the effective communication range of DCS 20, such as with equipment or sensors located remotely from the industrial plant but, still interconnected to one or more systems within the industrial plant.

DCS 20 may be configured to receive and display operational parameters associated with a plurality of equipment, and to generate automatic control signals and receive manual control inputs for controlling the operation of the equipment of industrial plant. In the exemplary embodiment, DCS 20 may include a software code segment configured to control processor 24 to analyze data received at DCS 20 that allows for on-line monitoring and diagnosis of the industrial plant machines. Data may be collected from each machine, including pumps and motors, associated process sensors, and local environmental sensors including, for example, vibration, seismic, ambient temperature and ambient humidity sensors. The data may be pre-processed by a local diagnostic module or a remote input/output module, or may transmitted to DCS 20 in raw form.

DCS 20 may operate independently to control the industrial plant, or may be communicatively coupled to one or more other control systems 110. Each control system 110 may communicate with each other and DCS 20 through a network segment 112, or may communicate through a network topology, for example, a star (not shown).

A continuous integrated machinery monitoring system (CIMMS) 114 may be a separate add-on hardware device, such as, for example, a personal computer (PC), that communicates with DCS 20 and other control systems 110 through network backbone 22. CIMMS 114 may also be embodied in a software program segment executing on DCS 20 and/or one or more of the other control systems 110. Accordingly, CIMMS 114 may operate in a distributed manner, such that a portion of the software program segment executes on several processors concurrently. As such, CIMMS 114 may be fully integrated into the operation of DCS 20 and other control systems 110. CIMMS 114 analyzes data received by DCS 20 and the other control systems 110 determine a health the machines and/or a process employing the machines using a global view of the industrial plant.

In the exemplary embodiment, network architecture 10 includes a server system 202 and one or more client systems 204. Server system 202 further includes a database server 206, an application server 208, a web server 210 a fax server 212, a directory server 214, and a mail server 216. Each of servers 206, 208, 210, 212, 214, and 216 may be embodied in software executing on server system 202, or any combinations of servers 206, 208, 210, 212, 214, and 216 may be embodied alone or in combination on separate server systems coupled in a local area network (LAN) (not shown). A disk storage unit 220 is coupled to server system 202. In addition, a workstation 222, such as a system administrator's workstation, a user workstation, and/or a supervisor's workstation are coupled to network backbone 22. Alternatively, workstations 222 are coupled to network backbone 22 using an Internet link 226 or are connected through a wireless connection.

Each workstation 222 may be a personal computer having a web browser. Although the functions performed at the workstations typically are illustrated as being performed at respective workstations 222, such functions can be performed at one of many personal computers coupled to network backbone 22. Workstations 222 are described as being associated with separate exemplary functions only to facilitate an understanding of the different types of functions that can be performed by individuals having access to network backbone 22.

Server system 202 is configured to be communicatively coupled to various individuals, including employees 228 and to third parties, e.g., service providers 230. The communication in the exemplary embodiment is illustrated as being performed using the Internet, however, any other wide area network (WAN) type communication can be utilized in other embodiments, i.e., the systems and processes are not limited to being practiced using the Internet.

In the exemplary embodiment, any authorized individual having a workstation 232 can access CIMMS 114. At least one of the client systems may include a manager workstation 234 located at a remote location. Workstations 222 may be embodied on personal computers having a web browser. Also, workstations 222 are configured to communicate with server system 202. Furthermore, fax server 212 communicates with remotely located client systems, including a client system 236 using a telephone link (not shown). Fax server 212 is configured to communicate with other client systems 228, 230, and 234, as well.

Computerized modeling and analysis tools of CIMMS 114, as described below in more detail, may be stored in server 202 and can be accessed by a requester at any one of client systems 204. In one embodiment, client systems 204 are computers including a web browser, such that server system 202 is accessible to client systems 204 using the Internet. Client systems 204 are interconnected to the Internet through many interfaces including a network, such as a local area network (LAN) or a wide area network (WAN), dial-in-connections, cable modems and special high-speed ISDN lines. Client systems 204 could be any device capable of interconnecting to the Internet including a web-based phone, personal digital assistant (PDA), or other web-based connectable equipment. Database server 206 is connected to a database 240 containing information about industrial plant 10, as described below in greater detail. In one embodiment, centralized database 240 is stored on server system 202 and can be accessed by potential users at one of client systems 204 by logging onto server system 202 through one of client systems 204. In an alternative embodiment, database 240 is stored remotely from server system 202 and may be non-centralized.

Other industrial plant systems may provide data that is accessible to server system 202 and/or client systems 204 through independent connections to network backbone 22. An interactive electronic tech manual server 242 services requests for machine data relating to a configuration of each machine. Such data may include operational capabilities, such as pump curves, motor horsepower rating, insulation class, and frame size, design parameters, such as dimensions, number of rotor bars or impeller blades, and machinery maintenance history, such as field alterations to the machine, as-found and as-left alignment measurements, and repairs implemented on the machine that do not return the machine to its original design condition.

A portable vibration monitor 244 may be intermittently coupled to LAN directly or through a computer input port such as ports included in workstations 222 or client systems 204. Typically, vibration data is collected in a route, collecting data from a predetermined list of machines on a periodic basis, for example, monthly or other periodicity. Vibration data may also be collected in conjunction with troubleshooting, maintenance, and commissioning activities. Such data may provide a new baseline for algorithms of CIMMS 114. Process data may similarly, be collected on a route basis or during troubleshooting, maintenance, and commissioning activities. Certain process parameters may not be permanently instrumented and a portable process data collector 244 may be used to collect process parameter data that can be downloaded to DCS 20 through workstation 222 so that it is accessible to CIMMS 114. Other process parameter data, such as process fluid chemistry analyzers and pollution emission analyzers may be provided to DCS 20 through a plurality of on-line monitors 246.

Electrical power supplied to various machines or generated by generated by generators with the industrial plant may be monitored by a motor protection relay 246 associated with each machine. Typically, such relays 246 are located remotely from the monitored equipment in a motor control center (MCC) or in switchgear 250 supplying the machine. In addition, to protection relays 246, switchgear 250 may also include a supervisory control and data acquisition system (SCADA) that provides CIMMS 114 with power supply or power delivery system (not shown) equipment located at the industrial plant, for example, in a switchyard, or remote transmission line breakers and line parameters.

FIG. 2 is a text listing of an exemplary Rule Set 280 Extended Mark-up Language (XML) file that may be used with CIMMS 114 (shown in FIG. 1). Rule set 280 may include a combination of one or more custom rules 282, and a series of properties 284 that define a behavior and a state of custom rules 282. Rules 282 and properties 284 may be bundled and stored in a format of an XML string, which may be encrypted based on, for example, a 25 character alphanumeric key when stored to a file. Rule set 280 is a modular knowledge cell that includes one or more inputs (not shown) and one or more outputs (not shown). Inputs may be software ports that direct data from specific locations in CIMMS 114 to Rule Set 280. For example, an input from a pump outboard vibration sensor may be transmitted to a hardware input termination in DCS 20. DCS 20 may sample the signal at that termination to receive the signal thereon. The signal may then be processed and stored at a location in a memory accessible and/or integral to DCS 20. A first input of Rule Set 280 may be mapped to the location in memory such that the contents of the location in memory is available to Rule Set 280 as an input. Similarly, an output may be mapped to another location in the memory accessible to DCS 20 or to another memory such that the location in memory contains the output of Rule Set 280.

In the exemplary embodiment, Rule Set 280 includes one or more rules relating to monitoring and diagnosis of specific problems associated with equipment operating in an industrial plant, such as, for example, a power plant, a refinery, and a chemical processing facility. Although Rule Set 280 is described in terms of being used with an industrial plant, Rule Set 280 may be appropriately constructed to capture any knowledge and be used for determining solutions in any field. For example, Rule Set 280 may contain knowledge pertaining to economic behavior, financial activity, weather phenomenon, design processes, and medical conditions. Rule set 280 may then be used to determine solutions to problems in these fields. Rule set 280 includes knowledge from one or many sources, such that the knowledge is transmitted to any system where Rule Set 280 is applied. Knowledge is captured in the form of rules that relate outputs to inputs such that a specification of inputs and outputs allows Rule Set 280 to be applied to CIMMS 114. Rule set 280 may include only rules specific to a specific plant asset and may be directed to only one possible problem associated with that specific plant asset. For example, Rule Set 280 may include only rules that are applicable to a motor or a motor/pump combination. Rule set 280 may only include rules that determine a health of the motor/pump combination using vibration data. Rule set 280 may also include rules that determine the health of the motor/pump combination using a suite of diagnostic tools that include, in addition to vibration analysis techniques, but may also include, for example, performance calculational tools and/or financial calculational tools for the motor/pump combination.

In operation, Rule Set 280 is created in a software developmental tool that prompts a user for relationships between inputs and outputs. Inputs may receive data representing, for example digital signals, analog signals, waveforms, manually entered and/or configuration parameters, and outputs from other Rule Sets. Rules within Rule Set 280 may include logical rules, numerical algorithms, application of waveform and signal processing techniques, expert system and artificial intelligence algorithms, statistical tools, and any other expression that may relate outputs to inputs. Outputs may be mapped to respective locations in the memory that are reserved and configured to receive each output. CIMMS 114 and DCS 20 may then use the locations in memory to accomplish any monitoring and/or control functions CIMMS 114 and DCS 20 may be programmed to perform. The rules of Rule Set 280 operate independently of CIMMS 114 and DCS 20, although inputs may be supplied to Rule Set 280 and outputs may be supplied to Rule Set 280, directly or indirectly through intervening devices.

Figure 3:
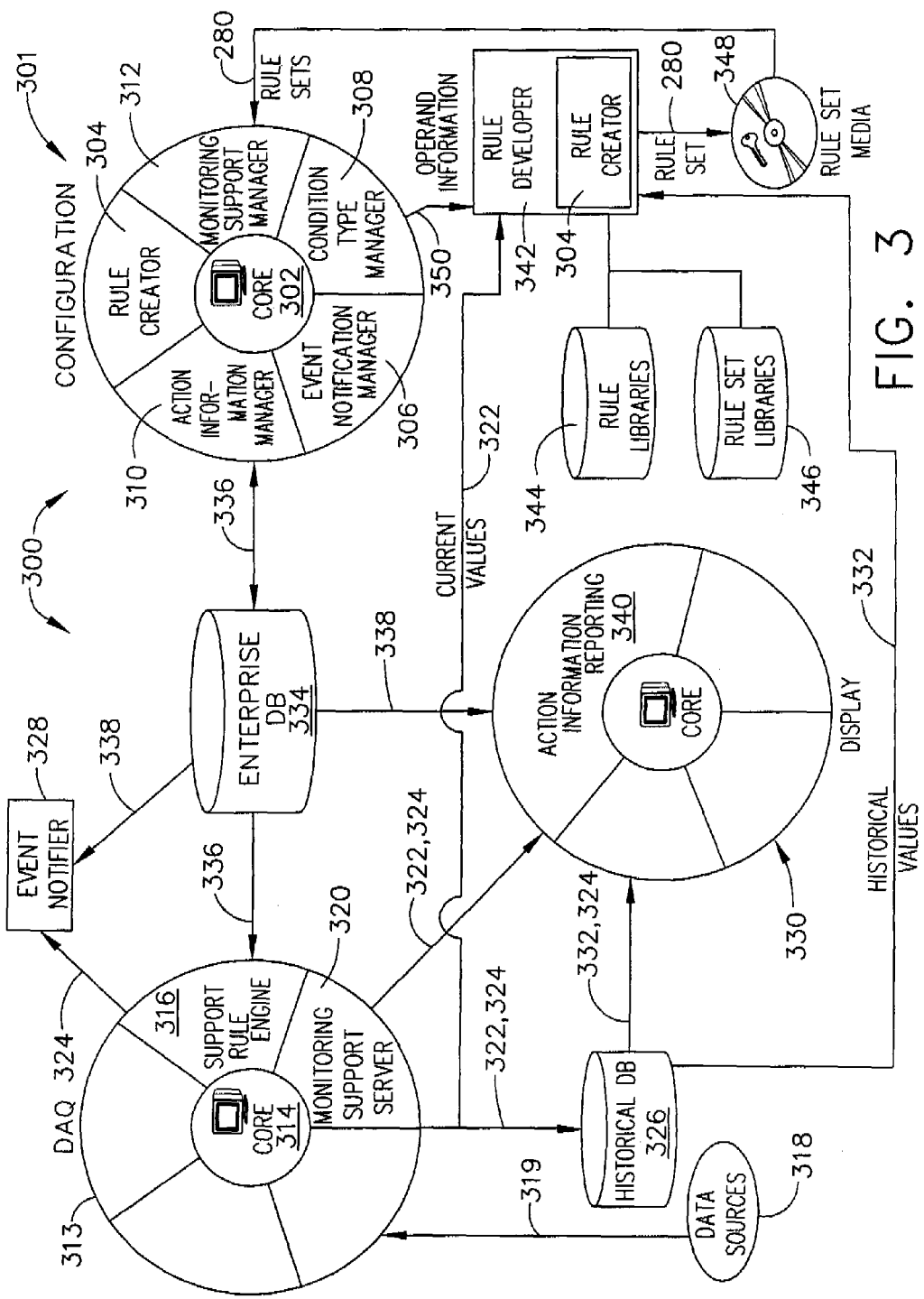
FIG. 3 illustrates an exemplary embodiment of a software architecture that may be used with the continuous integrated machinery monitoring system (CIMMS) shown in FIG. 1.

FIG. 3 illustrates an exemplary embodiment of a software architecture 300 that may be used with continuous integrated machinery monitoring system 114 (CIMMS) shown in FIG. 1. Architecture 300 is designed to support real-time applications and includes a Configuration Module 301. A configuration core executive component 302 provides supervision and support for modular Configuration Module applications, basic synchronization and user-provided management of interrupts, traps and exceptions. Configuration core executive component 302 may be is configured to accept additional applications that may extend the capabilities of CIMMS 114. Additionally, configuration core executive component 302 may provide support for multiple independent applications, support for trusted user and system applications, support for applications in user and supervisor address space and dynamic memory management.

Configuration core executive component 302 includes a User interface, Rule Creator application 304 that may be used to create all types of custom rules. An Event Notification Manager 306 may be used to configure at least three types of notifications, Email notifications, CIMMS notifications, and Relay card notifications. A Condition Type Manager 308 may be used to create and/or modify custom condition types, such as event types. An Action Information Manager 310 may be used to create and/or modify information text sets that are used in notifications and supporting evidence. In the exemplary embodiment, a Monitoring Support Manager 312 is a configuration core executive component plug-in that enables import and application of Rule Sets and a central frame-based application to perform all Monitoring Support related tasks. Monitoring Support Manager 312 may be launched from Configuration Module 301 or Rule Developer 342.

In the exemplary embodiment, architecture 300 includes a data acquisition (DAQ) module 313. A DAQ core executive component 314 provides support for a Monitoring Support Rule Engine 316. Monitoring Support Rule Engine 316 processes rules. Input into rules may be received from data sources 318, for example, but, not limited to raw data 319, measurement data from hardware, configured attributes from machines or other assets, and/or intermediate results from other rules. A Monitoring Support Server 320 is a component of DAQ core executive component 314 that supplies current values 322 and events 324 to a historical database (DB) 326, an Event Notifier 328, and a Display Module 330. Event Notifier 328 manages the notification of events to other systems, such as DCS 20, pop-up notification of events, and an email, pager and automated voice notification capability.

Raw data 319 may include unfiltered data from hardware such as machinery protection systems, instrument racks, input/output devices, and/or data exporters such as dynamic data exchange (DDE) and/or OLE for Process Control (OPC). In the exemplary embodiment, events 324 are generated by rules, and hardware or software alarms, and may include system events, such as configuration changes. Current Values/Status 322 may include raw or calculated data and includes a component status. Data representing Historical Values/Events 332 may be transmitted from Historical DB 326 to display core executive component 330 and may include, for example, time-stamped data from Historical DB 326. Historical Values/Events 332 may not be the same as current values 322 due to change filtering and may include events generated by rules, hardware and/or software alarms. An Enterprise Database 334 contains data representing a configuration of an enterprise, such as a business entity that may employ one or more CIMMS 114. Enterprise Database 334 may transmit Enterprise configuration data 336 to DAQ core executive component 314 and/or configuration core executive component 302 and may include information relative to the enterprise and instrument hierarchies, including, for example, but not limited to, configured assets, associations, and parent-child relationships. Enterprise Database 334 may transmit Hierarchy details/Status 338 data to Event Notifier 328 and/or display core executive component 330. Hierarchy details/Status 338 data may represent parent-child relationships within the enterprise or instrument hierarchies and status of each component. Display core executive component 330 includes an Action Information Reporting application 340 that displays supporting evidence for events in display core executive component 330.

In the exemplary embodiment, architecture 300 includes a stand-alone application, Rule Developer 342 that is used as a platform for developing and testing rules and Rule Sets 280. Rule Developer 342 includes an imbedded version of Rule Creator 304 and is communicatively coupled to at least one Rule Library 344 and/or at least one Rule Set Library 346. Each Rule Library 344 may be a separate database, containing rules under development for inclusion in Rule Sets 280. Rule Developer 342 may create and/or couple to a plurality of Rule Libraries 344. Similarly, each Rule Set Library 346 may be a separate database, containing one or more Rule Sets 280. Rule Developer 342 may create and/or couple to a plurality of Rule Set Libraries. Developed and tested Rule Sets 280 may be saved or transmitted using a Rule Set Media 348, for example, a CD-ROM, e-mail, or other distributable format. Rule Sets 280 are an asset-specific set of rules in a distributable format that be imported into CIMMS 114 and applied to one or more plant assets in one or more Enterprises.

In operation, and when communicatively coupled to DAQ Module 313, rules and Rule Sets 280 may be tested using current values 322 transmitted from DAQ Module 313 to Rule Developer 342. When communicatively coupled to Historical DB 326, rules and Rule Sets 280 may be tested against historical data. Rules may be validated by testing with data collected during a known problem or malfunction. When communicatively coupled to Configuration Module 301, Operand Information 350, being added to rules, may be transmitted from Configuration Module 301 to Rule Developer 342 with full relative path and type information. During testing, Rule Developer 342 allows viewing of intermediate values for each rule cycle using current values from DAQ module 313, historical values from Historical DB 326 and/or user defined values. Rule Developer 342 supports development of Rule Sets 280 through a life cycle that includes a trial mode, and a live mode. In the trial mode, the rule is accessible to Configuration Module 301 and/or Display Module 330 and can be trended but the rule does not generate alarms. In the live mode, the rule is fully operational. Each of the modes may be selectable a user selection buttons on a general page of the rule. In Monitoring Support Manager 312, a dialog to change the mode for a group of rules simultaneously may be accessible.

Rules within the rule library 344 may be formed into Rule Sets 280, which are a new segment type in the rule library database. Each rule may potentially belong to a plurality of Rule Sets 280. The relationship between rules and Rule Sets 280 may be maintained as segment child relationships in the Rule Developer database. Rule Sets 280 include rules and Rule Set 280 information (discussed in detail below). The Rule Set information may be stored as Rule Set segment properties.

Each Rule Set may have a globally unique identifier (GUID) and a version number. The GUID uniquely identifies a Rule Set 280 across versions and its integrity is maintained to permit unique identification. A version number may be a free text field entered by the user. The user uses this field to indicate the correct version of the user's Rule Sets 280.

Rule Sets 280 may be imported to an enterprise via MSM 312. Importing Rule Set 280 creates a new Rule Set template in the Rule Developer database. The Rule Set template may be created as a segment child of the Rule Set group segment. The Rule Set group segment will be a new segment type in the database. An instance of the Rule Set group segment will house all the child template versions of Rule Set 280 and may permit user to manage Rule Sets 280. In MSM 312 tree, a dummy node/new segment type may indicate the Rule Set group parent segment.

Rule Sets 280 may be applied to assets via MSM 312. A first time import will create a new Rule Set child below the asset and all the rules will be placed below the Rule Set child. An operand mapping dialog may be used at the time that Rule Set 280 is applied to an asset to link specific configured attributes of machines and/or measurements to each of the operands in Rule Set 280.

Rule Sets 280 may be reapplied to assets via the MSM 312. A message may be displayed to the user to indicate that the Rule Set reapplication may cause logic changes and segment id (SID) changes. SID is used internally in the database to identify elements in a machine train hierarchy, for example, all machines, bearings, data points, rules, etc have a distinct SID. A confirmation input from the user will change the rules according to the reapplied Rule Set. The GUIDs of the rules will be compared to associate the new Rule Set rules within the old Rule Set. Any child rule to the Rule Set without an associated rule in the new Rule Set would be deleted; any extra rule within the new Rule Set will be created.

Rules that are found in the old and new Rule Sets will have their results compared. All new results found in the rules will be added and deleted results will be removed and the result SID may be modified. If a change modifies the units on a variable, the point is orphaned, similarly if there is a result type change on the same rule GUID, the rule SID may be orphaned. Apart from a SID change rest of the template values will be used to merely update the rest of the fields in each of the template tables.

License information for Rule Set application may be transmitted via Rule Set 280. Configuration Module 301 and/or MSM 312 may allow/disallow application of Rule Sets 280 based on license information.

Rule Set file may include recognizing bytes so that it may be recognized by the importer. Rule Set 280 format may be included as, for example, two bytes, in the Rule Set file, as further described below.

A file check sum, for example, a 128-bit file check sum may be added to Rule Set 280 to monitor possible Rule Set file corruption during transit and Rule Set 280 may be encrypted using an encryption key, for example, a twenty-five byte key from the user to facilitate maintaining proprietary info of the file.

Rule Set 280 may be exported to a file in a format, such as:

| | |
|---|---|
| Byte 1 | char R |
| Byte 2 | char P |
| Byte 3 | Major version of Rule Set format 1 |
| Byte 4 | Minor version of Rule Set format 2 |
| Byte 5 | NULL |
| Byte 6 | NULL |
| Byte 7 | NULL |
| Byte 8 | NULL |
| Byte 9 | CheckSumByte |
| Byte 10 | CheckSumByte |
| Byte 11 | CheckSumByte |
| Byte 12 | CheckSumByte |
| Byte 13 | CheckSumByte |
| Byte 14 | CheckSumByte |
| Byte 15 | CheckSumByte |
| Byte 16 | CheckSumByte |
| Byte 17 | CheckSumByte |
| Byte 18 | CheckSumByte |
| Byte 19 | CheckSumByte |
| Byte 20 | CheckSumByte |
| Byte 21 | CheckSumByte |
| Byte 22 | CheckSumByte |
| Byte 23 | CheckSumByte |
| Byte 24 | CheckSumByte |

The binary data contained within the file may follow a format such as:

```
<RuleSetExport>
<RuleSetID>GUID</RuleSetID>
<RuleSetName>Name</RuleSetName>
<RuleSetDescription>DescriptionText</RuleSetDescription>
<RuleSetVersion>X.XX</RuleSetVersion>
<RuleSetRevision>Free Entry Text</RuleSetRevision>
<RuleSetState>Development/Deployed</RuleSetState>
<RuleSetAsset>Asset Type</RuleSetAsset>
<CustomRuleCount>N</CustomRuleCount>
<EnterpriseVersion>X.XX</EnterpriseVersion>
<CustomRule0>
  <Rule Template>
  Table Entries for Rule Template
  Custom Entries for Rule Template
  </Rule Template>
</CustomRule0>
<CustomRule1>
  Custom Rule (Defined by Template
  Importer/Exporter)...
  </CustomRule1>
    i. ...
    ii. ...
  <CustomRuleN>
    i. Custom Rule (Defined by Template
    Importer/Exporter)...
  </CustomRuleN>
</RuleSetExport>
```

The RuleSetId may be a GUID that will uniquely identify the Rule Set this will be generated by rule developer 342 when the Rule Set is created and stored as a Rule Set property.

The Rule Set name may be stored as a Rule Set segment name and tag name.

The Rule Set description text may be stored as a Rule Set segment property.

The Rule Set version may be entered by the user and may be stored as a Rule Set property.

The Rule Set revision may be maintained by Rule developer 342 and may be stored as a Rule Set property.

The Rule Set State may be an enumeration that will list out the possible states that a Rule Set can have, which may be stored as a segment property of the Rule Set state and the enumerations will be listed in the segment property type definition.

Rule Set Asset may define the asset type on which the rule may be applied and may be a segment type entry and may be stored as a segment property of the Rule Set. The asset type will not be binding on the user to apply the Rule Set to only a specific asset. In the case wherein the asset type is a custom type, then a custom entries section may also contain the asset template. Customers (OEM) may choose to define their asset type and have the Rule Sets for their custom asset type.

Figure 4:
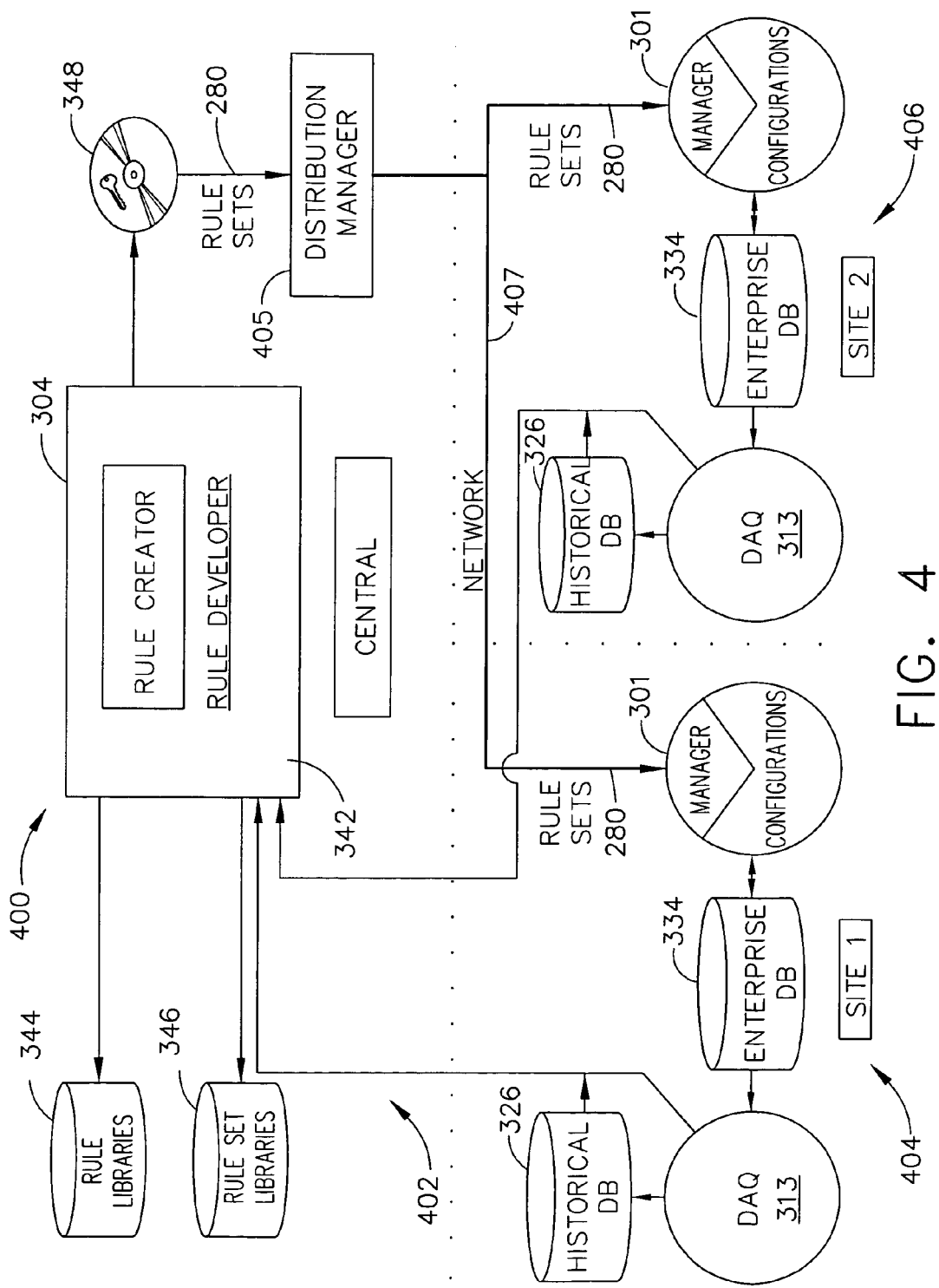
FIG. 4 is an exemplary embodiment of a centralized fleet model architecture that may be used with the software architecture shown in FIG. 3.

FIG. 4 is an exemplary embodiment of a centralized fleet model architecture 400 that may be used with software architecture 300 shown in FIG. 3. Centralized fleet model architecture 400 facilitates a remote application and management of Rule Sets 280 to a plurality of business entity enterprises. In the exemplary embodiment, centralized fleet model architecture 400 is illustrated with a central facility 402 and a first remote site 404, and a second remote site 406. Each remote site 404 and 406 may be located physically remotely from central facility 402 and/or the other remote site or all sites may be located adjacent to or within any other remote site or facility 402. For example, central facility 402 is a central control room, or headquarters of a business entity, remote site 404 may be a manufacturing site, such as a refinery, factory, or processing facility, and remote site 406 may be a co-generating power plant. In the exemplary embodiment, each remote site 404 and 406 includes a CIMMS 114 that includes configuration module 301 communicatively coupled to a Distribution Manager 405 located at central facility 402 through, for example, a network 407. Distribution Manger 405 is communicatively coupled to Rule Developer 342 through Rule Set Media 348. Rule Developer 342 includes an imbedded version of Rule Creator 304 and is communicatively coupled to at least one Rule Library 344 and/or at least one Rule Set Library 346. Each Rule Library 344 may be a separate database, containing rules under development for inclusion in Rule Sets 280. Rule Developer 342 may create and/or couple to a plurality of Rule Libraries 344. Similarly, each Rule Set Library 346 may be a separate database, containing one or more Rule Sets 280. Rule Developer 342 may create and/or couple to a plurality of Rule Set Libraries. Developed and tested Rule Sets 280 may be saved or transmitted using a Rule Set Media 348, for example, a CD-ROM, e-mail, or other distributable format to remote site 404 and/or remote site 406. Rule Sets 280 are an asset-specific set of rules in a distributable format that be imported into each CIMMS 114 and applied to one or more plant assets in remote site 404 and/or remote site 406. For example, each of remote site 404 and remote site 406 may include a pump/motor combination that are substantially identical. Each of remote site 404 and/or remote site 406 may receive, import, and apply Rule Set 280 to the pump/motor combination without the need for extensive programming at each remote site 404 and 406. Rule Sets 280 may be encrypted to substantially prevent importation of a Rule Set 280 without an authorized encryption key.

Figure 5:
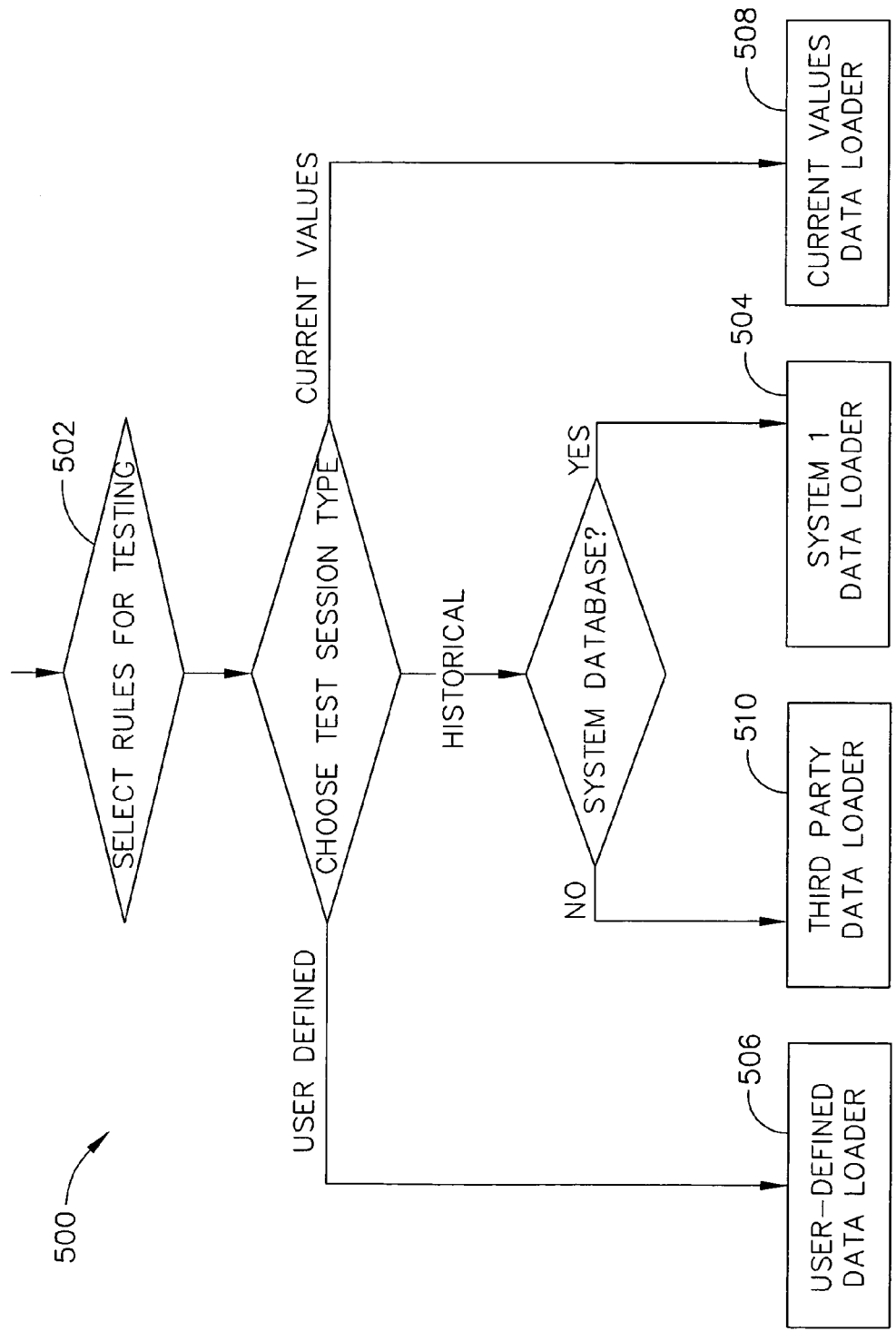
FIG. 5 is an illustration of exemplary embodiment of a rule testing session configuration that may be used with the Rule Developer module shown in FIG. 4.

FIG. 5 is an illustration of exemplary embodiment of a rule testing session configuration 500 that may be used with Rule Developer 342 shown in FIG. 4. Testing session configuration 500 may include all information that pertains to a session and generally cannot be changed during the execution of a test session. A user selects 502 which rules are to be included in the test session, and which data loader(s) that will be used to retrieve the test session data. At least four data loaders may be available to retrieve data for the testing session. A System Data Loader 504, a User-defined Values Data Loader 506, a Current Values Data Loader 508, and a third Party Database Data Loader.

User-defined data loader 506 may be used by Rule Developer 342 to load user-defined values into the testing session and may be used to test rules in an Enterprise or a Development Library. User-defined data loader 506 may not be mixed with other data loaders in a single test session.

Current Values data loader 508 may be used by Rule Developer 342 to load current values and may be used to test rules in an Enterprise or a Development Library. Current Values data loader 508 may not be mixed with other data loader types in a single test session. When testing with current values in an Enterprise, only one instance of the current values data loader is used per test session, operand mapping may not be required, all measurement operands within a single rule must come from a single DAQ module 313 and is enforced by the rule configuration, and rules within the test session may have different DAQ module assignments, but all must be in the same Enterprise and the single current values data loader 508 may be responsible for loading all operands. When testing with current values in a Development Library, operand mapping is required, operand sources may be from any Enterprise that Rule Developer 342 is connected to, operands within a single rule may come from different DAQ Modules 313, and one instance of current values data loader 508 is used for each Enterprise and each is responsible to get operand values for all DAQ Modules 313 within the Enterprise.

System Data Loader 504 may be used by either Rule Developer 342 to collect operand values from Historical DB 326 or an archive, and may be used to test rules within an Enterprise or a Development Library. When testing with historical values in an Enterprise only one instance of System Data Loader 504 may be used per test session, operand mapping may not be required. The single System Data Loader 504 may be responsible for loading all operands for the test session. When testing with historical values in a Development Library operand mapping may be required, operand sources can be from any Historical DB 326 or archive that Rule Developer 342 can connect to. One instance of System Data Loader 504 is used for each Enterprise and each System Data Loader 504 is responsible for retrieving operand values for all Historical DB 326 or archives that are linked to that Enterprise. System Data Loader 504 may be combined with third party data loaders 510 in the same test session.

Third Party Data Loader 510 may be used by Rule Developer 342 to collect operand values from third party databases. A custom interface to the database may be necessary. Third Party Data Loader 510 may be used to test rules within a Development Library only and one instance of third party data loader 510 may be used for each database. Third Party Data Loader 510 may be combined with other third party 510 or System data loaders 504 in the same test session.

Server and database names that will be the source of data for the rules may be input. Operand data may be user-defined values mapped to specific operands, may include operand mapping for current and/or historical values, and may be operand values to be extracted from a third party database. A time range of historical values, for historical testing only, may be selected. A user may determine whether or not to interpolate missing data within the input data set. Data may be missing from the selected input data set for various reasons, including equipment or sensor malfunction, file corruption, data out of range or scale. One of at least three interpolation options may be selected. If a step interpolation is selected, a value will remain constant until the next sample, if a linear interpolation is selected a linear slope interpolation is performed between samples that bound the missing data, and if no interpolation is selected, missing data may be marked, for example, "No Data".

An option to store outputs for each rule cycle, or only on change of state may be available to enable the user to examine large sets of data for event results, and to decrease processing time and the size of the output files. A change of state may be defined as a change in severity for a event result. When a rule cycle is executed that includes a change of state, all results in the test session may be stored. A rule processing frequency may range, for example, from one second to one day, with a default value generally applied if none is selected.

Figure 6:
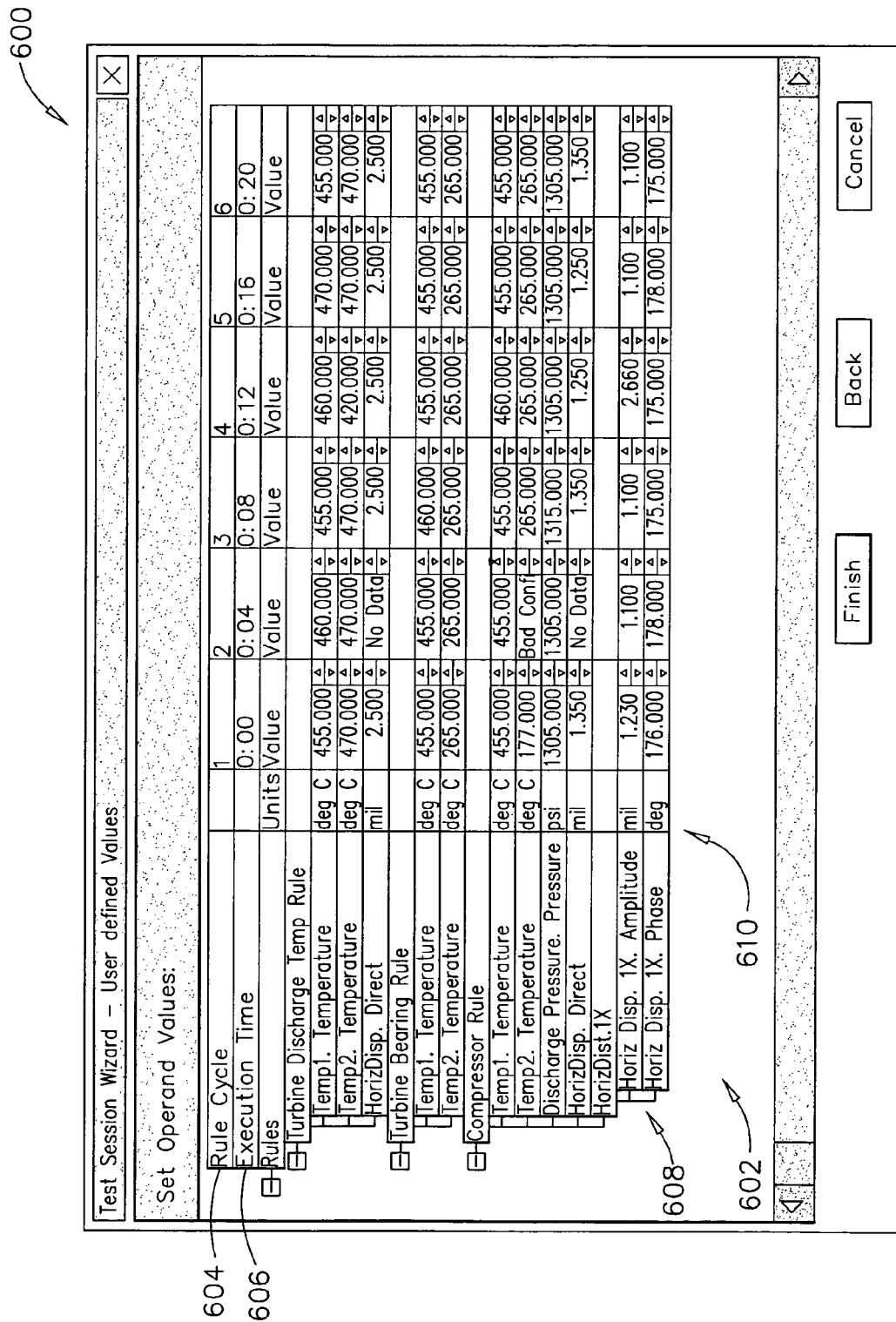
FIG. 6 is a screen shot of an exemplary embodiment of a user interface for entering user-defined values into a testing session.

FIG. 6 is a screen shot of an exemplary embodiment of user interface 600 for entering user-defined values into a testing session. When testing with user defined values, the user may be able to create a batch 602 of data to use as inputs into the rules. The user may be permitted to set the values for a series of rule execution cycles 604. The rule execution time 606 will start at 0:00 and increment by the interval selected. Multi-part operands 608, such as vectors or min-max-average may be shown as separate sub-levels. A units column 610 applies to every value in the row and is user-configurable. The user may enter the data for every value in batch 602, including Boolean operands, such as TRUE or FALSE. In another embodiment, a user may use multi-level right-click menu options to set units, status values, and Boolean or enumerated values. The availability of these menu options could be filtered depending on operand type. For example, for an enumerated type operand, a mouse right-click may display an On/Off selection choice. For all operand types, a mouse right-click may display a status selection, such as "Bad Configuration". For a Boolean type operand a mouse right click may display a "True/False" operand selection. In units column 610 for a temperature point, a mouse right-click may display a "Degrees C./Degrees F." operand selection choice. In another embodiment, an Excel™ spreadsheet is embedded in batch 602. Data values may be set to states of No Data or Bad Configuration as shown. Any cell not set to one of these statuses would be assumed to have an OK status. Cells with bad statuses may be color coded.

Figure 7:
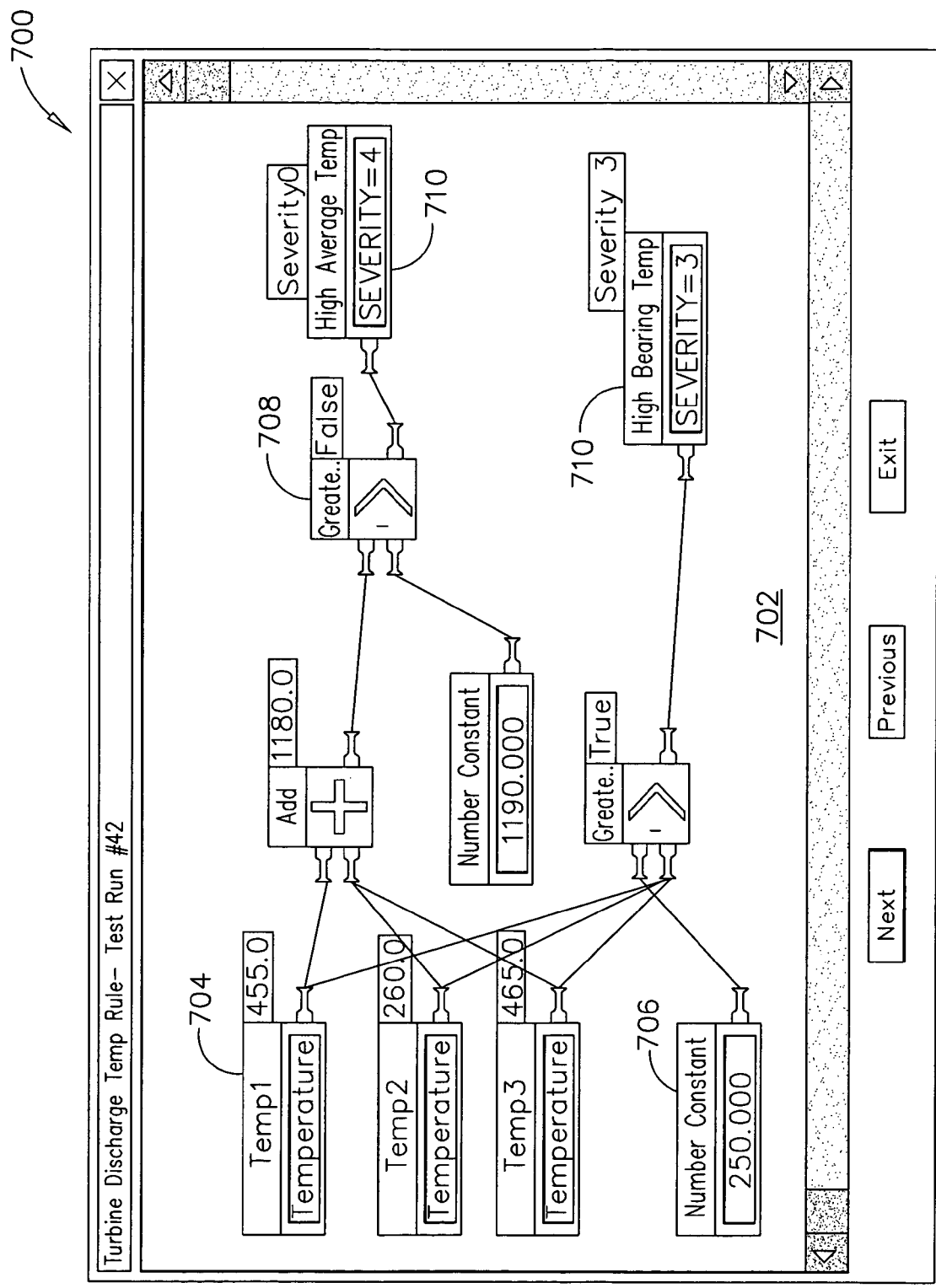
FIG. 7 is an exemplary screen shot of a rule test display screen.

FIG. 7 is an exemplary screen shot 700 of a rule test display screen 702. Screen 702 includes input data windows including user-defined values 704, and constant values 706, operands 708, and result windows 710. Each step of a test session may be incremented and intermediate values of each increment may be displayed.

Figure 8:
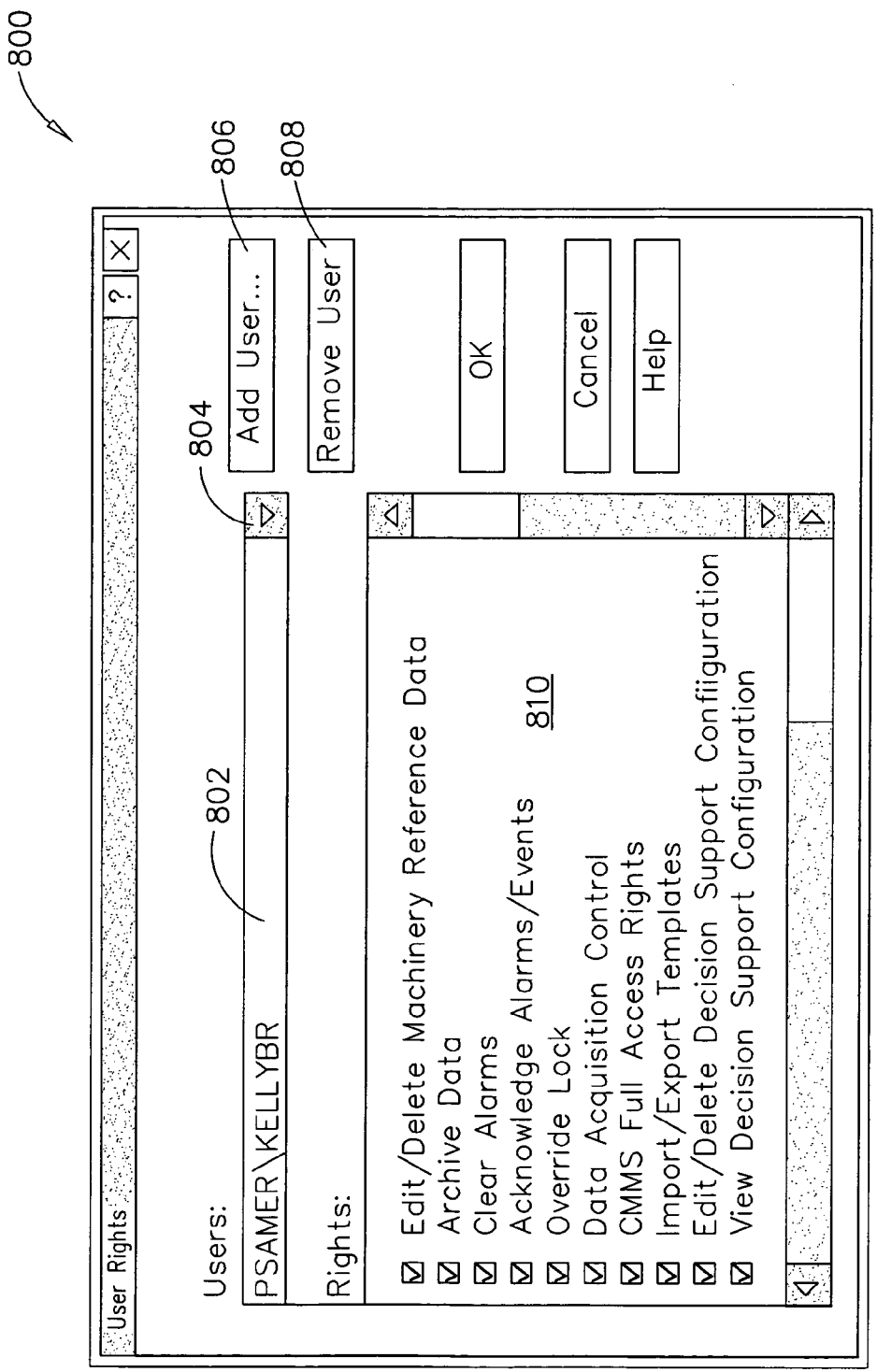
FIG. 8 is a screen shot of an exemplary user rights page of a security model that may be used with the Rule Developer module shown in FIG. 3.

FIG. 8 is a screen shot of an exemplary user rights page 800 of a security model that may be used with Rule Developer 342 (shown in FIG. 3). Rule Developer 342 includes a security model that facilitates supporting protection of the knowledge captured in the rules and Rule Sets 280 as Intellectual Property (IP) of the user, a customer, and/or a third party developer. The security model is configurable to provide an option of applying a plurality of security levels. Rights page 800 includes a "Users:" box 802 and an associated drop down menu selection tool 804. An "Add User." button 806 and a "Remove User" button 808 are operable depending on the rights of the user. A "Rights:" box 810 indicates the rights assigned to a user selected in "Users:" box 802.

The security model may include password protection for several features within an enterprise, Rule Developer 342, and/or Rule Sets 280 at bundling. For example, if a security is already being applied to the rule, then the user will be prompted to enter the old password before the security page can be opened. A password may be format restricted, for example, the password may be restricted to a combination of alpha and/or numeric characters and a length of six to twelve characters long. In the exemplary embodiment, the security model applies to viewing a logic page, operand mapping, viewing history, and adding of rules to a test session.

If a user copies a protected rule the security setting is carried along with the copied rule and is applied to a rule copied in the same enterprise or across different enterprises. All the security setting may be applied to the pasted rule. When a user tries to copy a rule from an enterprise to a development library, the user may be is prompted for the password before the copy into the development library is allowed. The user may not be allowed to copy multiple rules from an enterprise to a development library or from a development library to an enterprise. However, copying multiple rules may be allowed between two enterprises or between two development libraries.

Within an rule a user may be prompted for a password for an initial request to map any operands of the rule. If the rule has "Viewing history" settings enabled, the user may be prompted to enter the password for the rule. A user may be prompted for a password when the user adds a protected rule to a test session. If the user is granted access to the development rule library, the user will have all rights to the rules created under the development rule library.

The operand mapping feature of a Rule Set 280 in development may be protected, and a user is prompted to enter a password before operand mapping of the Rule Set is permitted. When the user exports Rule Set 280, distribution security applies to the rules within Rule Set 280 once it has been applied to an asset. Encryption, as used herein, refers to the actual physical media of Rule Set 280 (CD-ROM, etc.). An 'Auto Generate' button may use a random number generator to generate a series of 25 numbers and digits to determine the encryption. In addition to the encrypted key for distribution, a distribution security password may be enabled. The password may also be transmitted with the rules within Rule Set 280 when exported. Accordingly, operand mapping of rules will be password-protected after deploying the Rule Set.

Connecting to a system configuration database may include a Edit/Delete Configuration wherein only users with this level of security will be allowed to edit or delete any Rule Developer 342 objects, including rules, action plans, condition types, and notification plans. Connecting to a system configuration database may include an Import/Apply Rule Sets configuration. A View Monitoring Support Configuration permits a user to view any Monitoring Support objects.

The types of rights that may apply to a development library include, for example, but, are not limited to a read only view of the development library, an edit view that permits all the operations on a development library, and administrator rights that permits adding other users to the development library and implicitly selects the other rights, and a security settings view. Similarly, if the "Edit" right is selected, the "View" rights will be implicitly selected.

Figure 9:
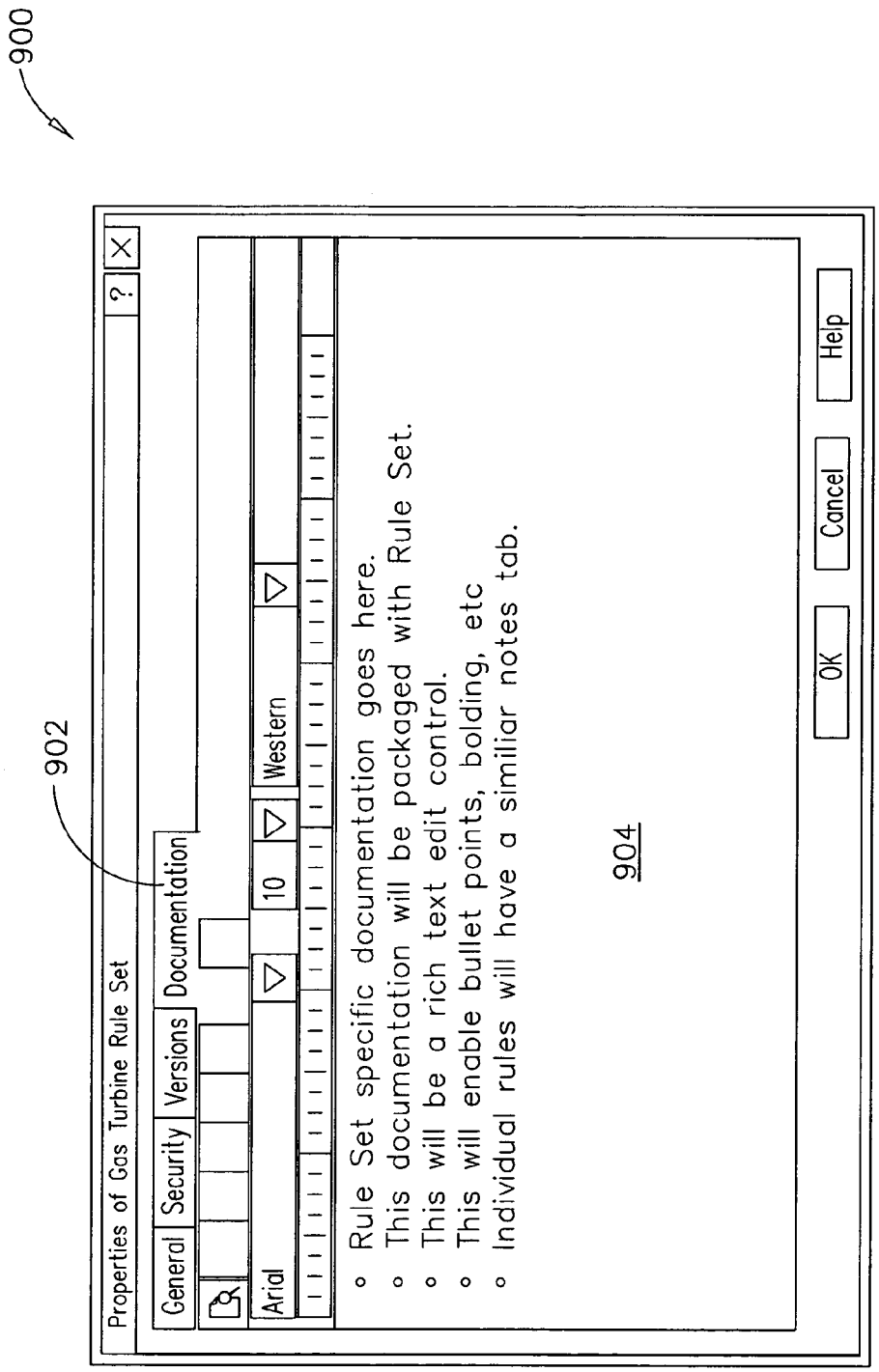
FIG. 9 illustrates an exemplary Rule Set level page that may be used with the Rule Developer module shown in FIG. 3.

FIG. 9 illustrates an exemplary Rule Set level page 900 that may be used with Rule Developer 342 (shown in FIG. 3). Rule Developer 342 includes a documentation configuration. Documentation of Rule Sets 280 may be created within Rule Developer 342 and is bundled into Rule Set 280. Within Rule Developer 342, documentation may be configurable at several levels, for example, a Rule Logic level, a Rule level, and a Rule Set level. The Rule Logic level enables the user to document the Rule Logic page. This step of the rule Logic will have no inputs or outputs, and may be a simple, resizable text box. The Rule Logic page becomes part of the rule logic and shows on the logic page at all times. The Rule level provides rule documentation for a rule. Documentation at Rule level may have security control because the Rule documentation may include significant IP. The dockable page is located on the Rule Logic Page and may be turned-on and turned-off. The Rule Set level provides for documentation that may be distributable with Rule Set 280 and may be security controlled for this reason. Rule Set level page 900 includes a plurality of menu tabs 902 for navigating to specific functional areas and a text box 904 for entering documentation for Rule Set 342.

A technical effect of the present invention is to capture expert knowledge in a form that can be created and modified without software coding by an application expert. A development system to create expert knowledge rules, test the rules using live data, historical data, user supplied data, and/or data supplied from a third party through a custom interface, commission the rules, and operate the rules permits expert knowledge to be created and bundled in a set of rules that can be protected from unauthorized use and be transmitted to a plurality of monitoring systems without substantial costly modification. The knowledge may be captured in the form of rules that relate the outputs of the set of software rules to the inputs of the set of software rules.

While the present invention is described with reference to an industrial plant, numerous other applications are contemplated. It is contemplated that the present invention may be applied to any control system, including facilities, such as commercial facilities, vehicles, for example ships, aircraft, and trains, and office buildings or a campus of buildings, as well as, refineries and midstream liquids facilities, and facilities that produce discrete product outputs, such as, factories.

The above-described systems and methods of creating, testing, protecting, and deploying one or more knowledge rules that are bundled in a modular, electronically transmittable form is cost-effective and highly reliable for facilitating monitoring and managing the operation and maintenance of facilities. More specifically, the methods and systems described herein facilitate determining facility machine health and alerting operators of anomalous conditions. As a result, the methods and systems described herein facilitate reducing plant operating costs in a cost-effective and reliable manner.

Exemplary embodiments of real-time equipment monitoring systems and methods are described above in detail. The systems are not limited to the specific embodiments described herein, but rather, components of each system may be utilized independently and separately from other components described herein. Each system component can also be used in combination with other system components.

While the invention has been described in terms of various specific embodiments, those skilled in the art will recognize that the invention can be practiced with modification within the spirit and scope of the claims.

What is claimed is:

1. A computer-implemented method of managing a machinery monitoring system, said method comprising:
   relating an asset output to at least one asset input wherein the at least one asset input includes at least one of a measured process parameter and a derived process parameter relatable to the asset output;

generating at least one rule based on the relation wherein the at least one rule defines the asset output based on the at least one asset input;

selecting at least one of live asset data, historical asset data, user-supplied asset data, and third party supplied asset data to test the at least one rule;

testing the at least one rule incrementally using the selected asset data and by comparing each asset output to each respective expected asset output, wherein the test comprises a plurality of incremental steps to be performed;

determining an expected asset output for the selected data after the plurality of incremental steps are performed;

monitoring the asset output of the at least one rule at each increment;

displaying incremental results after each of the plurality of incremental steps are completed, wherein each of the incremental results includes a numerical value corresponding to an intermediate value of a test result, wherein a numerical value of at least one incremental result is at least one of a sum, a difference, a product and a quotient of two or more incremental results; and outputting the test result.

2. A method in accordance with claim 1 further comprising bundling the at least one rule into a Rule Set that includes a Rule Set encryption code.

3. A method in accordance with claim 2 wherein bundling the at least one rule into a Rule Set comprises bundling a plurality of rules into an XML file.

4. A method in accordance with claim 2 wherein bundling the at least one rule into a Rule Set comprising bundling at least one of a rule documentation page and a Rule Set documentation page into the Rule Set.

5. A method in accordance with claim 1 further comprising:
transmitting the Rule Set to the machinery monitoring system;
decrypting the Rule Set encryption; and
importing the Rule Set into the monitoring system.

6. A method in accordance with claim 5 wherein importing the Rule Set comprises:
locating Rule Set files;
prompting a user for an encryption key; and
interpreting the Rule Set file.

7. A method in accordance with claim 6 further comprising:
entering Rule Set information into an enterprise database; and
refreshing a list of Rule Sets based on the Rule Set information.

8. A method in accordance with claim 5 wherein importing the Rule Set comprises:
checking an enterprise database for an existing copy of the imported Rule Set;
selectively updating any of the existing Rule Sets if the imported Rule Set is a different version than the existing Rule Set; and
updating assets using the imported Rule Set.

9. A method in accordance with claim 5 further comprising substantially preventing importing the Rule Set into the monitoring system unless an authorized encryption key is used.

10. A method in accordance with claim 1 wherein relating an asset output to at least one input comprises relating a measurable machine asset output to at least one input.

11. A method in accordance with claim 1 wherein relating an asset output to at least one input comprises relating a measurable machine asset output to at least one input wherein the at least one input is indicative of a machine asset anomalous behavior.

12. A method in accordance with claim 1 wherein generating at least one rule comprises resolving the operands for the at least one rule.

13. A method in accordance with claim 1 wherein generating at least one rule comprises documenting the rule logic for the at least one rule.

14. A method in accordance with claim 1 wherein relating an asset output to at least one input comprises prompting the user to enter a security control password.

15. A computer-implemented machinery monitoring system for a plant, said system comprising:
a client system comprising a user interface;
a database for storing Rule Sets, wherein the Rule Sets include at least one rule expressed as a relational expression of a real-time data output relative to a real-time data input that includes at least one of a measured process parameter and a derived process parameter relatable to the real-time data output, wherein the relational expression is specific to a plant asset; and
a processor programmed to control said machinery monitoring system to, said processor manager programmed to:
prompt a user for a security control password;
generate a plant asset operational rule from an application expert wherein the operational rule defines the real-time data output based on the at least one real-time data input;
test said rule based on at least one of live asset data, historical asset data, user- supplied asset data, and third party supplied data, wherein the test includes comparing the real-time output to an expected real-time output, and wherein the test comprises a plurality of incremental steps to be performed;
determine an asset output after the plurality of incremental steps are performed;
display incremental results after each of the plurality of incremental steps are completed, wherein each of the incremental results includes a numerical value corresponding to an intermediate value of a test result, wherein a numerical value of at least one incremental result is at least one of a sum, a difference, a product and a quotient of two or more incremental results; and
output the test result.

16. A system in accordance with claim 15 wherein said processor is further programmed to bundle the at least one rule into a Rule Set that includes a Rule Set encryption code.

17. A system in accordance with claim 16 wherein said processor is further programmed to bundle a plurality of rules into an XML file.

18. A system in accordance with claim 16 wherein said processor is further programmed to bundle at least one of a rule documentation page and a Rule Set documentation page into said Rule Set.

19. A system in accordance with claim 15 wherein said processor is further programmed to:
transmit said Rule Set to said at least one machinery monitoring system;
decrypt said Rule Set encryption; and
import said Rule Set into said at least one monitoring system.

20. A system in accordance with claim 19 wherein said processor is further programmed to:
locate Rule Set files;
prompt a user for an encryption key; and
interpret said Rule Set file.

21. A system in accordance with claim 20 wherein said processor is further programmed to:
   enter Rule Set information into said database; and
   refresh a list of Rule Sets based on said Rule Set information.

22. A system in accordance with claim 19 wherein said processor is further programmed to:
   check said database for an existing copy of said imported Rule Set;
   selectively update any of said existing Rule Sets if said imported Rule Set is a different version than said existing Rule Set; and
   update assets using said imported Rule Set.

23. A system in accordance with claim 19 wherein said processor is further programmed to substantially prevent importing said Rule Set into said at least one monitoring system unless an authorized encryption key is used.

24. A system in accordance with claim 15 wherein said processor is further programmed to relate a measurable machine asset output to at least one input.

25. A system in accordance with claim 15 wherein said processor is further programmed to relate a measurable machine asset output to at least one input that is indicative of a machine asset anomalous behavior.

26. A system in accordance with claim 15 wherein said processor is further programmed to resolve the operands for the at least one rule.

27. A system in accordance with claim 15 wherein said processor is further programmed to receive, from a user, documentation of the rule logic for said at least one rule.

28. A system in accordance with claim 15 wherein said processor is further programmed to prompt the user to enter a security control password.

29. A computer program embodied on a computer readable medium for managing a machinery monitoring system using a server system coupled to a client system and a database, said client system including a user interface, said program comprising a code segment that prompts a user for a security control password and then:
   relates an asset output to at least one asset input that includes at least one of a measured process parameter and a derived process parameter relatable to the asset output;
   generates a plant asset operational rule from an application expert wherein the operational rule defines an asset output based on at least one asset input;
   tests said rule based on at least on of live asset data, historical asset data, user-supplied asset data, and third party supplied data wherein the testing includes comparing the asset output to a respective expected asset output, wherein the test comprises a plurality of incremental steps to be performed;
   determines an asset output after the plurality of incremental steps are performed;
   displays incremental results after each of the plurality of incremental steps are completed, wherein each of the incremental results includes a numerical value corresponding to an intermediate value of a test result, wherein a numerical value of at least one incremental result is at least one of a sum, a difference, a product and a quotient of two or more incremental results; and
   outputs said results of said test.

30. A computer program in accordance with claim 29 further comprising a code segment that bundles said at least one rule into a Rule Set that includes a Rule Set encryption code.

31. A computer program in accordance with claim 30 further comprising a code segment that bundles a plurality of rules into an XML file.

32. A computer program in accordance with claim 30 further comprising a code segment that bundles at least one of a rule documentation page and a Rule Set documentation page into said Rule Set.

33. A computer program in accordance with claim 29 further comprising a code segment that:
   transmits said Rule Set to said at least one machinery monitoring system;
   decrypts said Rule Set encryption; and
   imports said Rule Set into said at least one monitoring system.

34. A computer program in accordance with 33 further comprising a code segment that:
   locates Rule Set files;
   prompts a user for an encryption key; and
   interprets said Rule Set file.

35. A computer program in accordance with claim 34 further comprising a code segment that:
   enters Rule Set information into an enterprise database; and
   refreshes a list of Rule Sets based on said Rule Set information.

36. A computer program in accordance with claim 33 further comprising a code segment that:
   checks an enterprise database for an existing copy of said imported Rule Set;
   selectively updates any of said existing Rule Sets if said imported Rule Set is a different version than said existing Rule Set; and
   updates assets using said imported Rule Set.

37. A computer program in accordance with claim 33 further comprising a code segment that substantially prevents importing said Rule Set into said at least one monitoring system unless an authorized encryption key is used.

38. A computer program in accordance with claim 29 further comprising a code segment that relates a measurable machine asset output to at least one input.

39. A computer program in accordance with claim 29 further comprising a code segment that relates a measurable machine asset output to at least one input wherein said at least one input is indicative of a machine asset anomalous behavior.

40. A computer program in accordance with claim 29 further comprising a code segment that resolves the operands for said at least one rule.

41. A computer program in accordance with claim 29 further comprising a code segment that receives, from a user, documentation of the rule logic for said at least one rule.

42. A computer program in accordance with claim 29 further comprising a code segment that prompts the user to enter a security control password.

* * * * *